United States Patent
Liang (10) Patent No.: US 12,493,317 B2
(45) Date of Patent: Dec. 9, 2025

(54) CLOCK MANAGEMENT CIRCUIT AND CLOCK MANAGEMENT METHOD

(71) Applicant: REALTEK SEMICONDUCTOR CORPORATION, Hsinchu (TW)

(72) Inventor: Yu-Jie Liang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 156 days.

(21) Appl. No.: 18/236,713

(22) Filed: Aug. 22, 2023

(65) Prior Publication Data
US 2024/0069590 A1     Feb. 29, 2024

(30) Foreign Application Priority Data
Aug. 25, 2022   (TW) .................................. 111132085

(51) Int. Cl.
*G06F 1/08* (2006.01)
(52) U.S. Cl.
CPC ...................... *G06F 1/08* (2013.01)
(58) Field of Classification Search
CPC ...................... G06F 1/28; G06F 1/08
See application file for complete search history.

(56) References Cited

U.S. PATENT DOCUMENTS

| | | | | |
|---|---|---|---|---|
| 2011/0047397 A1* | 2/2011 | Lee | .................. | G06F 1/3203 |
| | | | | 713/324 |
| 2019/0346875 A1* | 11/2019 | Cheng | .................. | G06F 1/06 |
| 2023/0396879 A1* | 12/2023 | Bossuyt | .................. | H04N 23/611 |

FOREIGN PATENT DOCUMENTS

| | | |
|---|---|---|
| TW | I676879 B | 11/2019 |
| TW | 201947341 A | 12/2019 |

OTHER PUBLICATIONS

Summary of the TW OA letter in regard to the counterpart application: (1) Claim(s) 1-2 and 6-7 is/are rejected under Patent Law Article 22(1) as allegedly being anticipated by reference 1 T(W 201947341 A) (2) Claim(s) 3-5 and 8-10 is/are rejected under Patent Law Article 22(2) as allegedly being unpatentable over reference 1 T(W 201947341 A).

\* cited by examiner

*Primary Examiner* — Zahid Choudhury
(74) *Attorney, Agent, or Firm* — WPAT, PC (57) ABSTRACT

A clock management circuit and a clock management method are used for managing an operating clock of a processor circuit, and the processor circuit changes the level of a state signal according to an interrupt signal. The clock management circuit includes a delay circuit for delaying a wake-up interrupt to generate a delayed wake-up interrupt; and a clock control circuit for generating the operating clock according to a reference clock, generating the wake-up interrupt according to the state signal, and adjusting the frequency of the operating clock according to the delayed wake-up interrupt.

10 Claims, 10 Drawing Sheets

CLOCK MANAGEMENT CIRCUIT AND CLOCK MANAGEMENT METHOD

BACKGROUND OF THE INVENTION

1. Field of the Invention

The present invention generally relates to clock management, and, more particularly, to a clock management circuit and a clock management method for high-speed circuits.

2. Description of Related Art

Generally speaking, because of clock gating, a processor circuit consumes less power in the idle state than in the active state. When the processor circuit switches from the idle state to the active state, that is, when the processor circuit is woken up, there is often an instantaneous current peak (i.e., current surge) as a result of the instantaneous power extraction due to the clock gating being turned on, causing supply voltage drop (IR drop) on the printed circuit board on which the processor circuit is mounted. When the supply voltage drop on the printed circuit board exceeds the tolerance value, the processor circuit may behave unexpectedly, resulting in the failure of the circuit functions. Although it is feasible to add a capacitor on the printed circuit board to stabilize the supply voltage, adding the capacitor causes an increase in cost. Therefore, the present invention provides a circuit design to mitigate current surges (i.e., to reduce the IR drop).

The foregoing processor circuit is, for example, a high-speed circuit such as a central processing unit (CPU), a core of a CPU, a microcontroller, and a microprocessor. The active state may also be referred to as a full speed state. The idle state may also be referred to as a resting state or a no-load state.

SUMMARY OF THE INVENTION

In view of the issues of the prior art, an object of the present invention is to provide a clock management circuit and a clock management method, so as to make an improvement to the prior art.

According to one aspect of the present invention, a clock management circuit for managing an operating clock of a processor circuit is provided. The processor circuit changes a level of a state signal according to an interrupt. The clock management circuit includes a delay circuit and a clock control circuit. The delay circuit is configured to delay a wake-up interrupt to generate a delayed wake-up interrupt. The clock control circuit is coupled to the delay circuit and configured to generate the operating clock according to a reference clock, generate the wake-up interrupt according to the state signal, and adjust a frequency of the operating clock according to the delayed wake-up interrupt.

According to another aspect of the present invention, a clock management method of managing an operating clock of a processor circuit is provided. The processor circuit changes a level of a state signal according to an interrupt. The clock management method includes the following steps: generating the operating clock according to a reference clock; generating a wake-up interrupt according to the state signal; delaying the wake-up interrupt to generate a delayed wake-up interrupt; and adjusting a frequency of the operating clock according to the delayed wake-up interrupt.

The technical means embodied in the embodiments of the present invention can solve at least one of the problems of the prior art. Therefore, the present invention can mitigate current surges compared with the prior art.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes a clock management circuit and clock management method. On account of that some or all elements of the clock management circuit could be known, the detail of such elements is omitted provided that such detail has little to do with the features of this disclosure, and that this omission nowhere dissatisfies the specification and enablement requirements. Some or all of the processes of the clock management method may be implemented by software and/or firmware and can be performed by the clock management circuit or its equivalent. A person having ordinary skill in the art can choose components or steps equivalent to those described in this specification to carry out the present invention, which means that the scope of this invention is not limited to the embodiments in the specification.

In the following description, signals are active-high, which means that signals are active at high levels and inactive at low levels, and that asserting/de-asserting a signal means setting the signal high/low. This is for the purpose of explanation, not for limiting the scope of the invention. In other words, in an alternative implementation, signals can be active-low, which means that signals are active at low levels and inactive at high levels, and that asserting/de-asserting a signal means setting the signal low/ high. A level transition or a logic level transition means that a signal changes from an asserted (active) state to a de-asserted (inactive) state, or from a de-asserted (inactive) state to an asserted (active) state.

Figure 1:
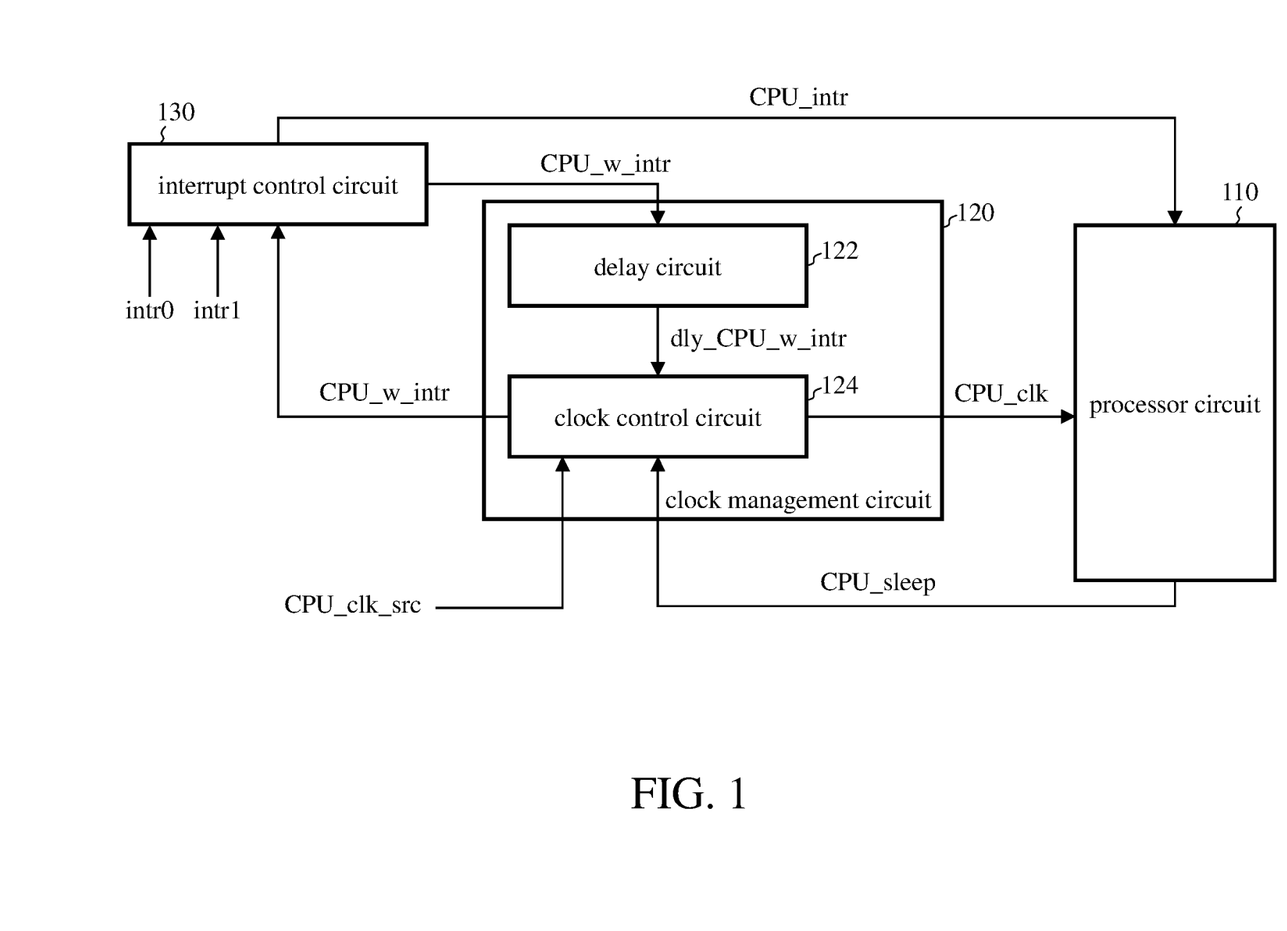
FIG. 1 is a functional block diagram of a clock management circuit according to an embodiment of the present invention.

FIG. 1 is a functional block diagram of the clock management circuit 120 according to an embodiment of the present invention. The clock management circuit 120 includes a delay circuit 122 and a clock control circuit 124. The clock management circuit 120 receives the reference clock CPU_clk_src and provides the operating clock CPU_clk to the processor circuit 110. The processor circuit 110 operates in an idle state or an active state according to the operating clock CPU_clk and the interrupt CPU_intr. The processor circuit 110 causes itself to enter the idle state from the active state or enter the active state from the idle state by changing the state signal CPU_sleep. The processor circuit 110 can change the level of the state signal CPU_sleep according to the interrupt CPU_intr. The interrupt control circuit 130 is configured to control the interrupt. As shown in the figure, the interrupt control circuit 130 receives the interrupt intr0, the interrupt intr1, and the wake-up interrupt CPU_w_intr, sends the interrupt CPU_intr to the processor circuit 110, and sends the wake-up interrupt CPU_w_intr to the clock management circuit 120. The delay circuit 122 generates a delayed wake-up interrupt dly_CPU_w_intr by delaying the wake-up interrupt CPU_w_intr. The clock control circuit 124 further adjusts the operating clock CPU_clk according to the delayed wake-up interrupt dly_CPU_w_intr.

Figure 2:
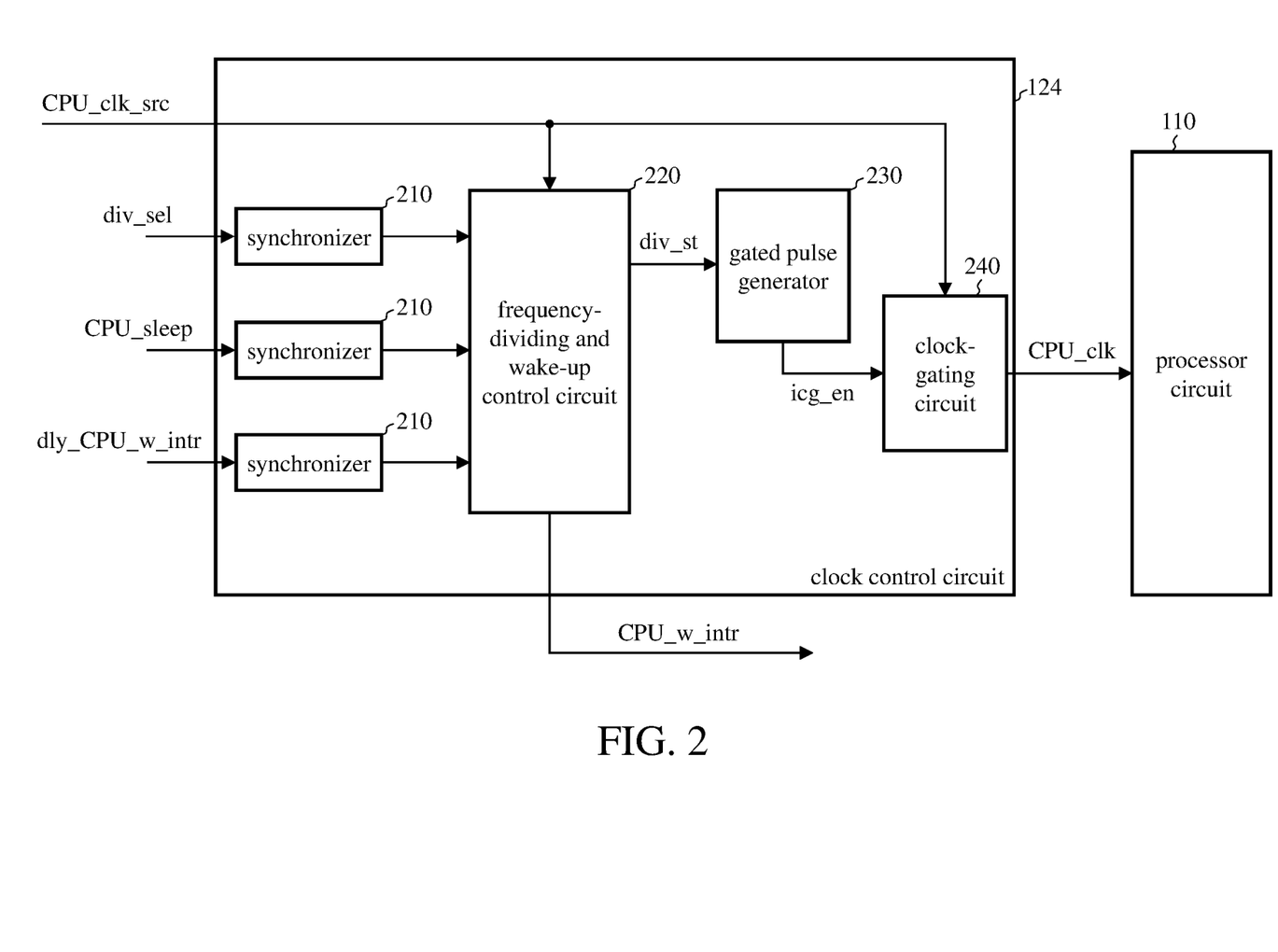
FIG. 2 shows a functional block diagram of the clock control circuit according to an embodiment.

FIG. 2 shows a functional block diagram of the clock control circuit 124 according to an embodiment. The clock control circuit 124 includes multiple synchronizers 210, a frequency-dividing and wake-up control circuit 220, a gated pulse generator 230, and a clock-gating circuit 240.

The function of the synchronizer 210 is to synchronize the divisor selection signal div_sel, the state signal CPU_sleep, and the delayed wake-up interrupt dly_CPU_w_intr to avoid insufficient timing margin. If, however, the three signals belong to a same clock domain, the synchronizer 210 can be omitted.

The frequency-dividing and wake-up control circuit 220 receives the reference clock CPU_clk_src, the divisor selection signal div_sel, the state signal CPU_sleep, and the delayed wake-up interrupt dly_CPU_w_intr. The frequency-dividing and wake-up control circuit 220 generates or changes the frequency-dividing signal div_st according to the state signal CPU_sleep and the delayed wake-up interrupt dly_CPU_w_intr, and generates or asserts the wake-up interrupt CPU_w_intr according to the state signal CPU_sleep and the delayed wake-up interrupt dly_CPU_w_intr.

The gated pulse generator 230 generates the gating signal icg_en according to the frequency-dividing signal div_st. More specifically, the gated pulse generator 230 adjusts the frequency of the gating signal icg_en according to the frequency-dividing signal div_st.

The clock-gating circuit 240 generates the operating clock CPU_clk by gating the reference clock CPU_clk_src according to the gating signal icg_en. The clock-gating circuit 240 is well known to people having ordinary skill in the art; thus, the details are omitted for brevity.

Figure 3:
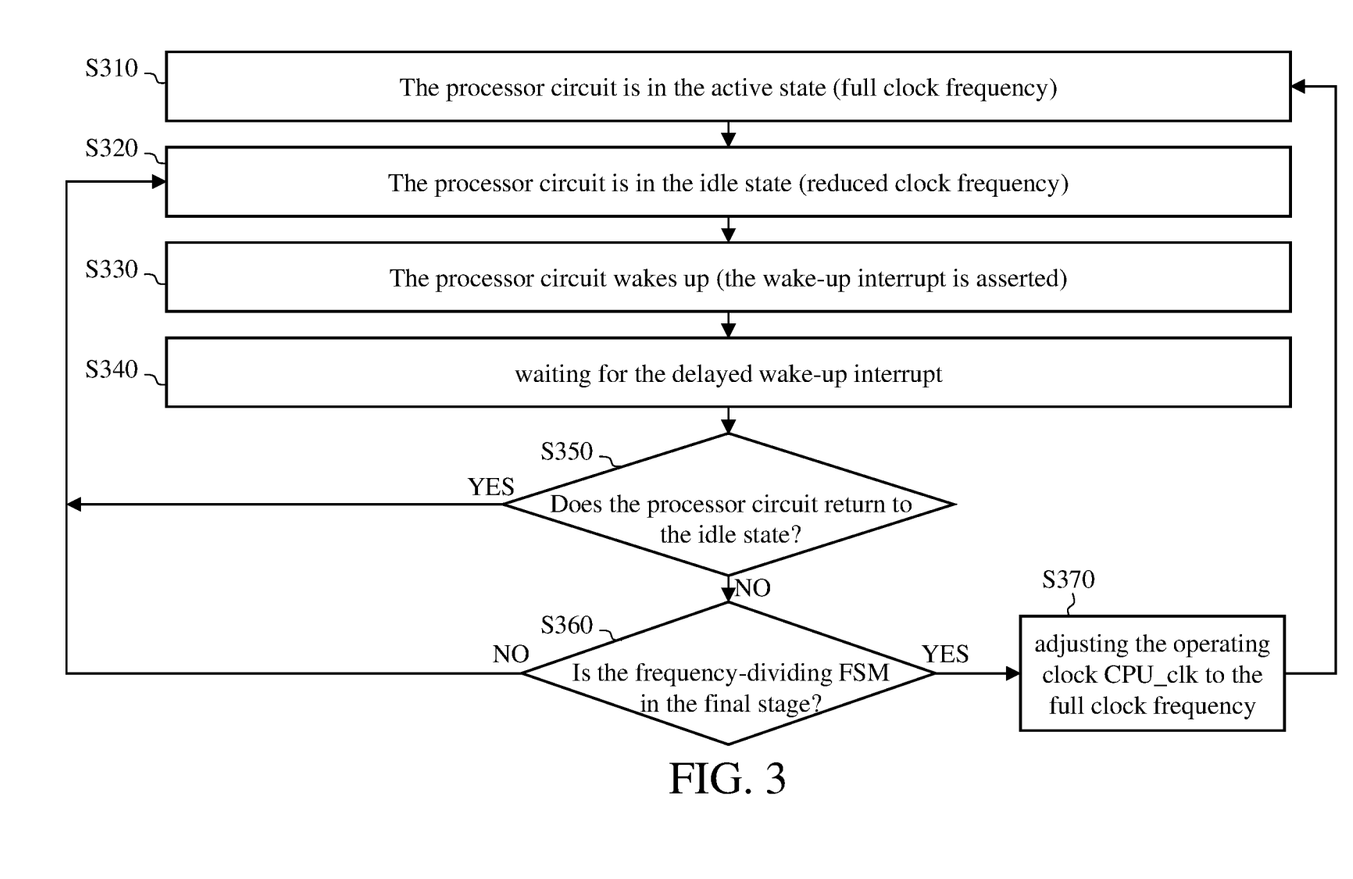
FIG. 3 is a flowchart of a clock management method according to an embodiment of the present invention.
Figure 4:
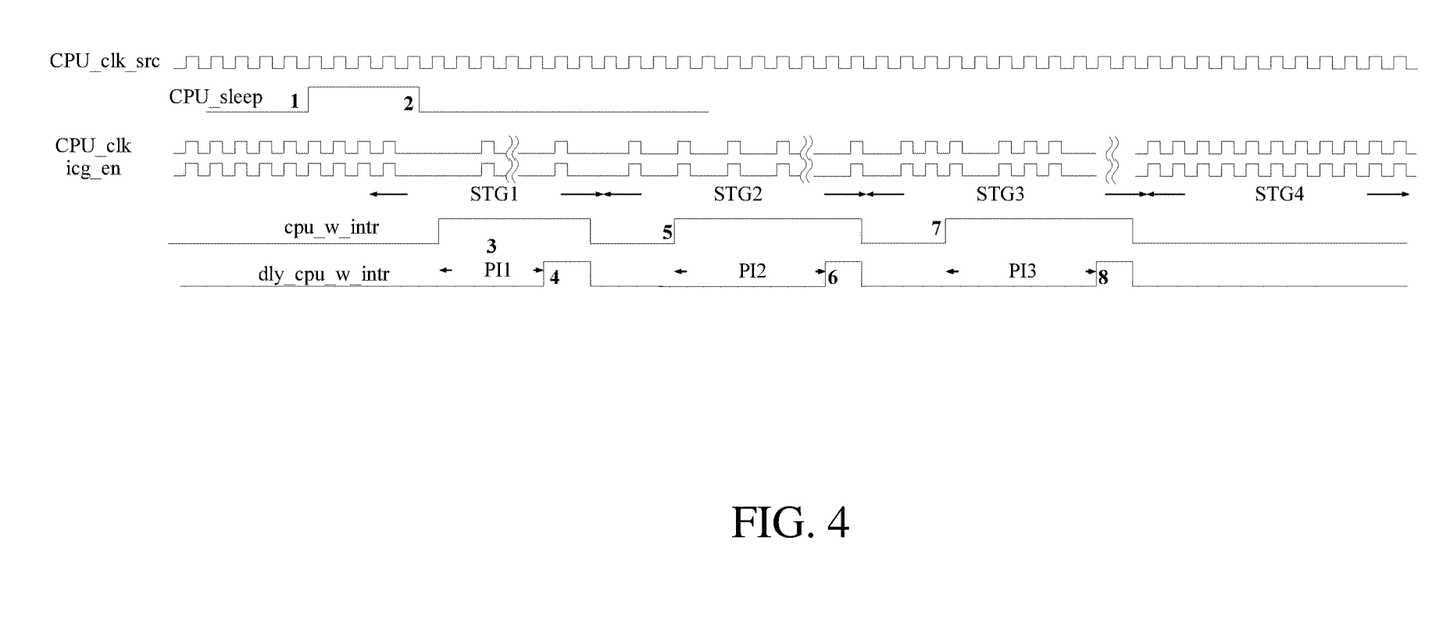
FIG. 4 is an example of the timing of multiple clocks and signals.

FIG. 3 is a flowchart of the clock management method according to an embodiment of the present invention. FIG. 4 is an example of the timing of the reference clock CPU_clk_src, the state signal CPU_sleep, the operating clock CPU_clk, the gating signal icg_en, the wake-up interrupt CPU_w_intr, and the delayed wake-up interrupt dly_CPU_w_intr. The operating principle of the clock control circuit 124 is discussed below in connection with FIG. 3 and FIG. 4. The process in FIG. 3 includes the following steps.

Step S310: The processor circuit 110 is in the active state, which means that the frequency of the operating clock CPU_clk is the full clock frequency. For example, before the symbol "1" in FIG. 4.

Step S320: The processor circuit 110 is in an idle state. In this step, the clock control circuit 124 reduces the clock frequency of the operating clock CPU_clk. For example, the state signal CPU_sleep is asserted at the symbol "1" in FIG. 4, and then the processor circuit 110 operates at a lower clock frequency (lower than the full clock frequency of the stage STG4) in the stages STG1, STG2 and STG3.

Step S330: The processor circuit 110 wakes up, that is, the state signal CPU_sleep is de-asserted, and the clock control circuit 124 asserts the wake-up interrupt CPU_w_intr. For example, the state signal CPU_sleep is de-asserted at the symbol "2" in FIG. 4, and the wake-up interrupt CPU_w_intr is asserted at the symbol "3."

Step S340: The clock control circuit 124 waits for the delayed wake-up interrupt dly_CPU_w_intr, that is, the clock control circuit 124 waits for the delayed wake-up interrupt dly_CPU_w_intr to become asserted (which is equivalent to the reception of the delayed wake-up interrupt dly_CPU_w_intr). For example, this step may correspond to the waiting time PI1 between the symbol "3" and the symbol "4," the waiting time PI2 between the symbol "5" and the symbol "6," and the waiting time PI3 between the symbol "7" and the symbol "8" in FIG. 4.

Step S350: The clock control circuit 124 determines whether the processor circuit returns to the idle state, that is, determines whether the state signal CPU_sleep becomes asserted (which is equivalent to the reception of the state signal CPU_sleep). If the result of step S350 is YES, then the process returns to step S320; if not, the process proceeds to step S360.

Step S360: The clock control circuit 124 determines whether the frequency-dividing finite state machine (FSM) is in the final stage (or state). The frequency-dividing FSM is a part of the frequency-dividing and wake-up control circuit 220 and will be discussed in detail below. In some embodiments, the frequency-dividing FSM uses the signal div_st_nxt to indicate its next state. This step can be determined according to the signal div_st_nxt. If the result of step S360 is YES, then the process proceeds to step S370; if not, then the process returns to step S320. In the example of FIG. 4, the stage STG3 is the final stage (or state); therefore, at the symbols "4" and "6," the result of step S360 is NO, and at the symbol "8," the result of step S360 is YES.

Step S370: The clock control circuit 124 adjusts the frequency of the operating clock CPU_clk to the full clock frequency (i.e., to cause the processor circuit 110 to operate in the active state), and then the process returns to step S310. As shown in FIG. 4, after the symbol "8," the clock control circuit 124 adjusts the frequency of the operating clock CPU_clk to the full clock frequency, so that the processor circuit 110 operates in the active state (i.e., the stage STG4).

As shown in FIG. 3 and FIG. 4, after the processor circuit 110 wakes up (step S330), the clock control circuit 124 does not immediately adjust the operating clock CPU_clk from the lowest clock frequency (e.g., the stage STG1 in FIG. 4)

to the full clock frequency (e.g., the stage STG4 in FIG. 4), but keeps the operating clock CPU_clk at a lower clock frequency (i.e., lower than the full clock frequency, such as the stage STG2 and the stage STG3 in FIG. 4) for a period of time (which is proportional to the waiting time PI2 and waiting time PI3) according to the state of the frequency-dividing FSM (step S360).

In addition, if the state signal CPU_sleep is asserted in the stage STG2 or the stage STG3 (i.e., the result of step S350 is YES), the frequency-dividing FSM of the clock control circuit 124 returns to the stage STG1 instead of proceeding to the next stage (the stage STG3 or the stage STG4), so that the processor circuit 110 operates in the idle state again.

The waiting time PH, the waiting time PI2, and the waiting time PI3 in FIG. 4 are adjustable. For example, they can be adjusted by setting the delay circuit 122 through software.

Note that the number of states of the clock control circuit 124 (more specifically, the frequency-dividing FSM) may be M (which is an integer greater than 2). In the example of FIG. 4, M is 4 (i.e., the stage STG1, the stage STG2, the stage STG3, and the stage STG4). M can be set by the divisor selection signal div_sel. Each state corresponds to a different frequency of the operating clock CPU_clk.

As discussed above, because the clock management circuit 120 can gradually increase the clock frequency of the operating clock CPU_clk (instead of jumping from the lowest frequency (e.g., the stage STG1) to the highest frequency (e.g., the stage STGM)), the current surges can be reduced (i.e., huge IR drop can be avoided).

Figure 5:
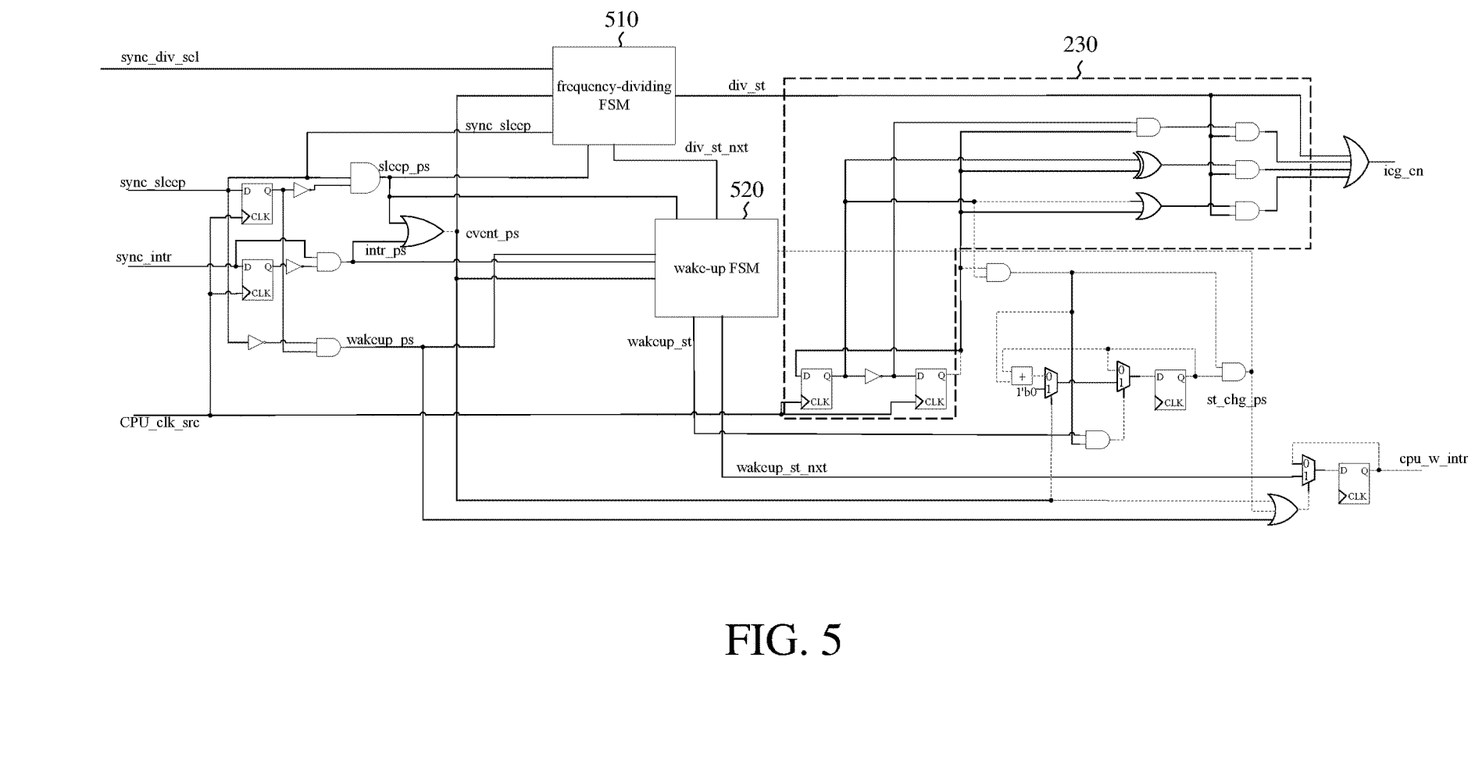
FIG. 5 is a circuit diagram of the frequency-dividing and wake-up control circuit and the gated pulse generator according to an embodiment.

FIG. 5 shows a circuit diagram of the frequency-dividing and wake-up control circuit 220 and the gated pulse generator 230 according to an embodiment. The frequency-dividing and wake-up control circuit 220 includes the circuits other than the gated pulse generator 230, that is, the frequency-dividing and wake-up control circuit 220 includes a frequency-dividing FSM 510, a wake-up FSM 520, multiple logic gates, and multiple flip-flops.

The signal sleep_ps is related to the state of the state signal CPU_sleep. More specifically, the signal sleep_ps being logic 1 means that the state signal CPU_sleep changes from de-asserted to asserted.

The signal intr_ps is related to the state of the delayed wake-up interrupt dly_CPU_w_intr. More specifically, the signal intr_ps being logic 1 means that the delayed wake-up interrupt dly_CPU_w_intr changes from de-asserted to asserted.

The signal event_ps is related to the state of the signal sleep_ps and the state of the signal intr_ps. More specifically, the signal event_ps is logic 1 when the state signal CPU_sleep changes from de-asserted to asserted or the delayed wake-up interrupt dly_CPU_w_intr changes from de-asserted to asserted.

The signal wakeup_ps is related to the state of the state signal CPU_sleep. More specifically, the signal wakeup_ps being logic 1 indicates that the state signal CPU_sleep changes from asserted to de-asserted.

The signal div_st_nxt indicates the next state of the frequency-dividing FSM 510. For example, in the example of FIG. 4, the signal div_st_nxt indicates the stage STG1, the stage STG2, the stage STG3, or the stage STG4. The states of the frequency-dividing FSM 510 will be discussed in detail below in connection with FIG. 6.

The signal wakeup_st and the signal wakeup_st_nxt are respectively used to indicate the current state and the next state of the wake-up FSM 520. Only when the signal event_ps, the signal wakeup_ps, or the signal st_chg_ps is logic 1, the signal wakeup_st jumps to the next state according to the conditions in FIG. 7. The states of the wake-up FSM 520 will be discussed in detail below in connection with FIG. 7.

The signal st_chg_ps indicates the state change of the wake-up FSM 520.

The circuit of the gated pulse generator 230 is well known to people having ordinary skill in the art; the details are thus omitted for brevity. In the example of FIG. 5, the circuit of the gated pulse generator 230 corresponds to a case where the frequency-dividing FSM 510 has four states (the stage STG1, the stage STG2, the stage STG3, and the stage STG4, as shown in the example of FIG. 6).

Figure 6:
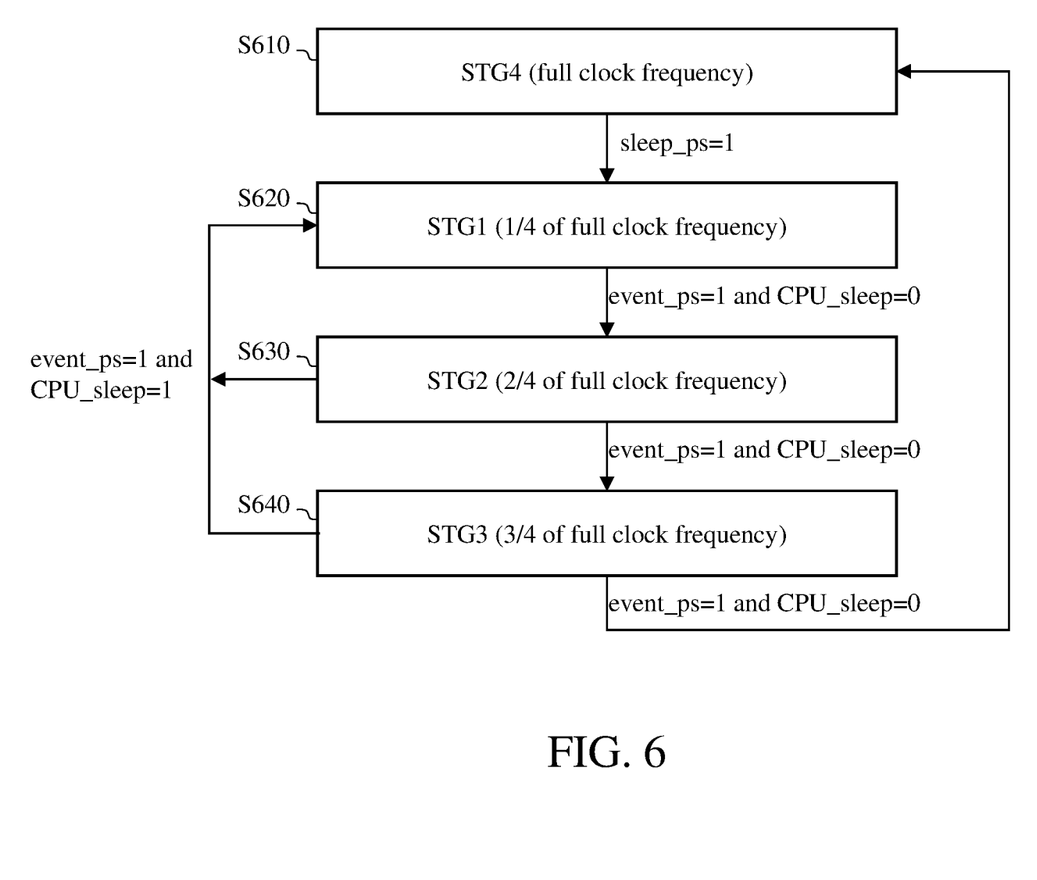
FIG. 6 shows an example of a frequency-dividing finite state machine (FSM) of the present invention.

FIG. 6 shows an example of the frequency-dividing FSM 510 of the present invention. In this example, the frequency-dividing FSM 510 includes four states: the state S610, the state S620, the state S630, and the state S640. The state S610 corresponds to the stage STG4 in FIG. 4 (the frequency-dividing signal div_st indicates that the frequency of the gating signal icg_en (that is, the frequency of the operating clock CPU_clk) is the full clock frequency). The state S620 corresponds to the stage STG1 in FIG. 4 (the frequency-dividing signal div_st indicates that the frequency of the gating signal icg_en is one quarter of the full clock frequency). The state S630 corresponds to the stage STG2 in FIG. 4 (the frequency-dividing signal div_st indicates that the frequency of the gating signal icg_en is two quarters of the full clock frequency). The state S640 corresponds to the stage STG3 in FIG. 4 (the frequency-dividing signal div_st indicates that the frequency of the gating signal icg_en is three quarters of the full clock frequency).

As shown in FIG. 6, when the frequency-dividing FSM 510 is in the state S610 and the signal sleep_ps is logic 1, the frequency-dividing FSM 510 enters the state S620. When the frequency-dividing FSM 510 is in the state S620, the signal event_ps is logic 1, and the state signal CPU_sleep is logic 0, the frequency-dividing FSM 510 enters the state S630. When the frequency-dividing FSM 510 is in the state S630, the signal event_ps is logic 1, and the state signal CPU_sleep is logic 0, the frequency-dividing FSM 510 enters the state S640. When the frequency-dividing FSM 510 is in the state S640, the signal event_ps is logic 1, and the state signal CPU_sleep is logic 0, the frequency-dividing FSM 510 enters the state S610. When the frequency-dividing FSM 510 is in the state S630, the signal event_ps is logic 1, and the state signal CPU_sleep is logic 1, the frequency-dividing FSM 510 enters the state S620. When the frequency-dividing FSM 510 is in the state S640, the signal event_ps is logic 1, and the state signal CPU_sleep is logic 1, the frequency-dividing FSM 510 enters the state S620.

Figure 7:
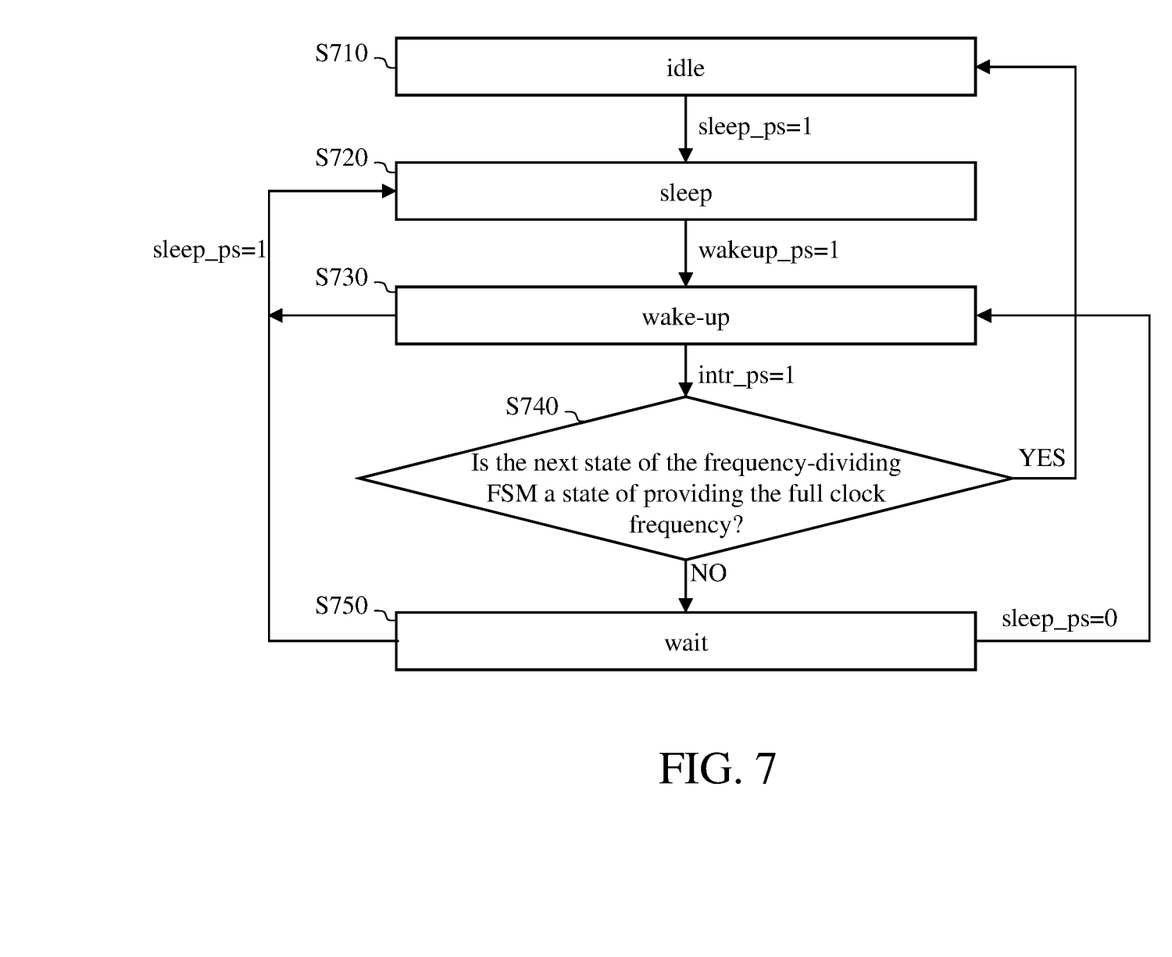
FIG. 7 shows an example of the wake-up FSM of the present invention.

FIG. 7 shows an example of the wake-up FSM 520 of the present invention. The wake-up FSM 520 includes the following five states.

State S710: the idle state. This state corresponds to processor circuit 110 being in the active state (i.e., operating at the full clock frequency). When the wake-up FSM 520 is in the state S710 and the signal sleep_ps is logic 1 (e.g., corresponding to the symbol "1" in FIG. 4), the wake-up FSM 520 enters the state S720.

State S720: the sleep state. This state corresponds to the processor circuit 110 being in an idle state (i.e., operating at one M fraction of the full clock frequency). When the wake-up FSM 520 is in the state S720 and the signal wakeup_ps is logic 1 (e.g., corresponding to the symbol "2" in FIG. 4), the wake-up FSM 520 enters the state S730.

State S730: the wake-up state. In this state, the wake-up FSM 520 asserts the wake-up interrupt CPU_w_intr (e.g., corresponding to the symbols "3," "5" or "7" in FIG. 4) by controlling the signal wakeup_st and the signal wakeup_st_nxt. When the wake-up FSM 520 is in the state S730 and the signal intr_ps is logic 1 (e.g., corresponding to the symbol "4," "6" or "8" in FIG. 4), the wake-up FSM 520 enters the state S740. When the wake-up FSM 520 is in the state S730 and the signal sleep_ps is logic 1 (which means that the frequency-dividing FSM 510 changes from the state S640 to the state S620 or from the state S630 to the state S620), the wake-up FSM 520 enters the state S720.

State S740: the determination state. The wake-up FSM 520 determines whether the next state of the frequency-dividing FSM 510 is a state of providing the full clock frequency (e.g., the state S610 in FIG. 6). If YES (i.e., corresponding to the processor circuit 110 being about to return to the active state to operate at the full clock frequency), the wake-up FSM 520 return to the state S710 (e.g., corresponding to the symbol "8" in FIG. 4); if NO (e.g., corresponding to symbol "4" or "6" in FIG. 4), the wake-up FSM 520 enters the state S750.

State S750: the waiting state. The wake-up FSM 520 wait for the frequency-dividing FSM 510 to change state (i.e., to change the frequency-dividing signal div_st and signal div_st_nxt). When the wake-up FSM 520 enters the state S750, the signal st_chg_ps is logic 1, and the following operations are performed according to the signal sleep_ps. If the signal sleep_ps is logic 1, which means that the processor circuit 110 will enter the idle state again, the frequency-dividing FSM 510 changes from the state S640 to the state S620 or from the state S630 to the state S620. If the signal sleep_ps is logic 0, which means that the processor circuit 110 continues to wake up, the frequency-dividing FSM 510 changes from the state S620 to the state S630 or from the state S630 to the state S640. The logic 1 of the signal st_chg_ps may correspond to the falling edge between the symbols "4" and "5" or the falling edge between the symbols "6" and "7" in FIG. 4.

People having ordinary skill in the art can use logic gates and/or transistors to implement the frequency-dividing FSM 510 and the wake-up FSM 520 according to the discussions related to FIG. 6 and FIG. 7.

In summary, the present invention provides multiple stages for the operating clock CPU_clk, and each stage produces a different clock frequency. Therefore, when the processor circuit 110 returns to the active state from the idle state, its operating clock CPU_clk gradually changes from the lowest clock frequency to the full clock frequency, so that current surges can be mitigated.

Figure 8A:
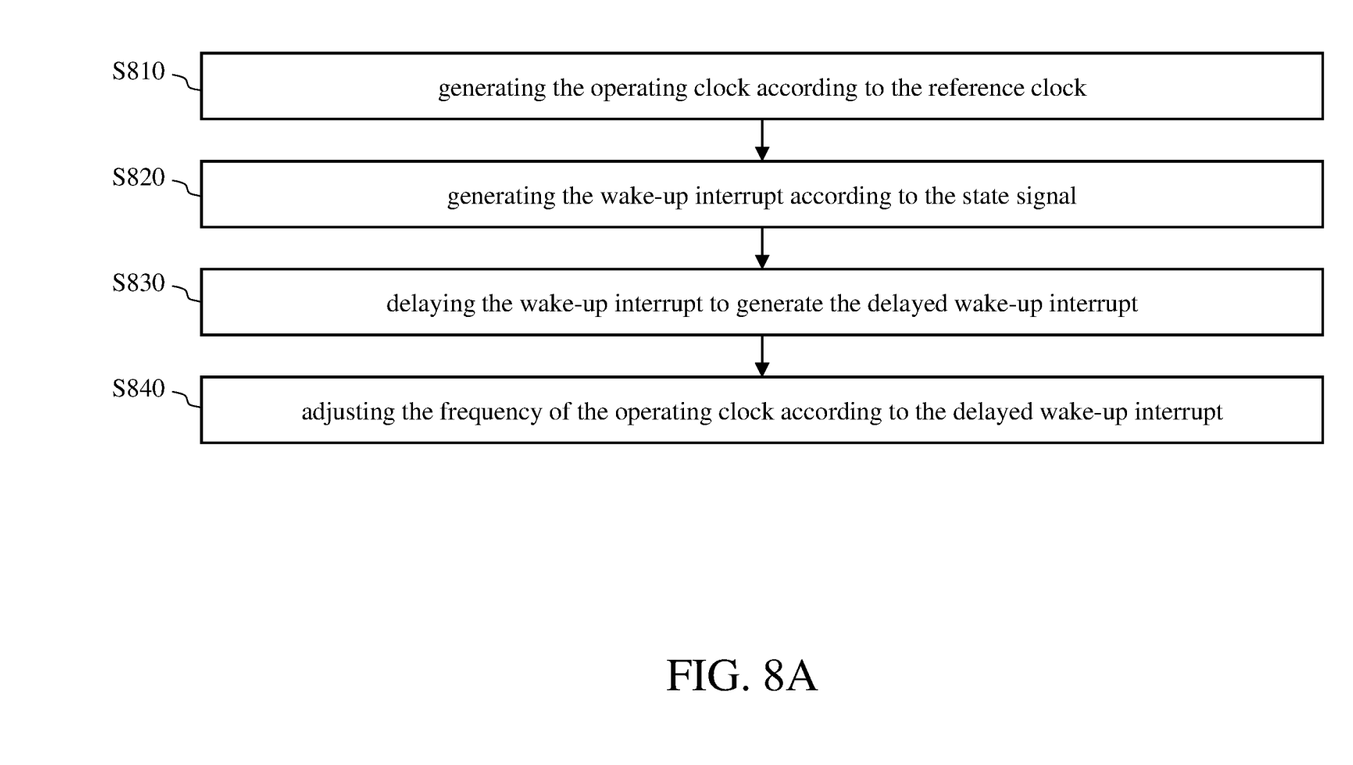
FIGS. 8A-8C are flowcharts of the clock management method according to an embodiment of the present invention.
Figure 8B:
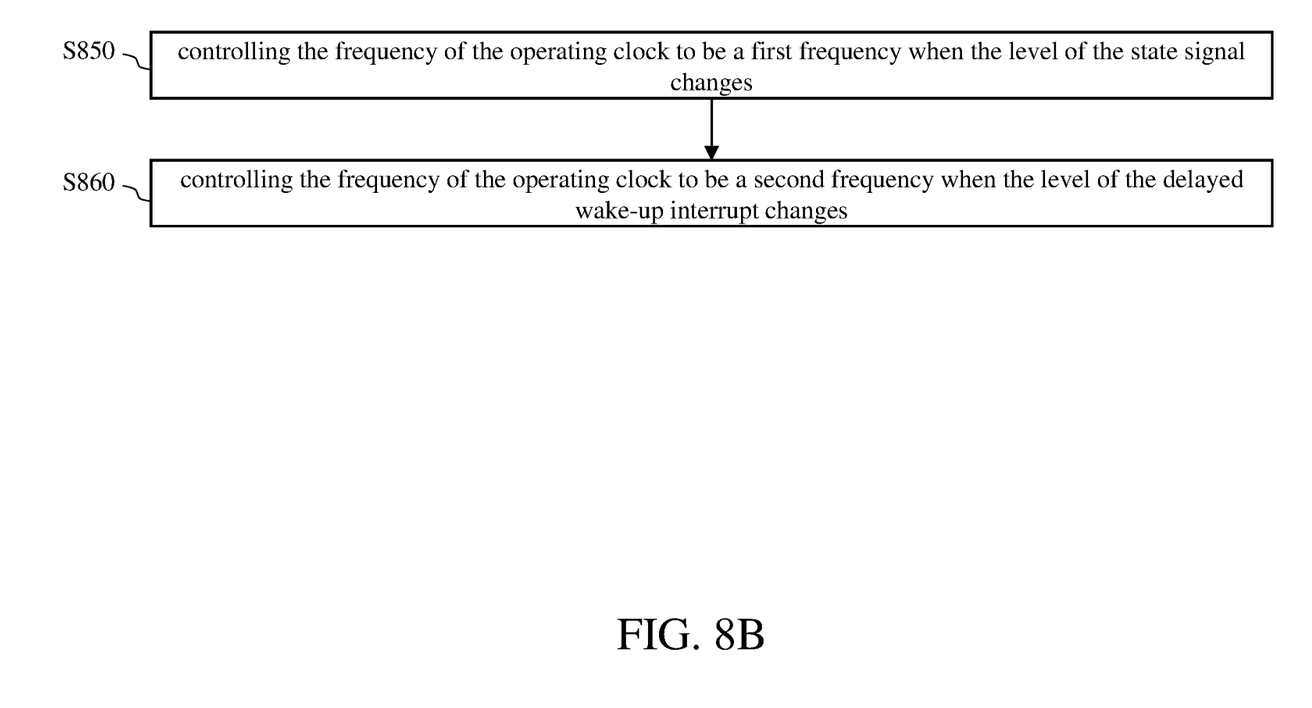
Figure 8C:
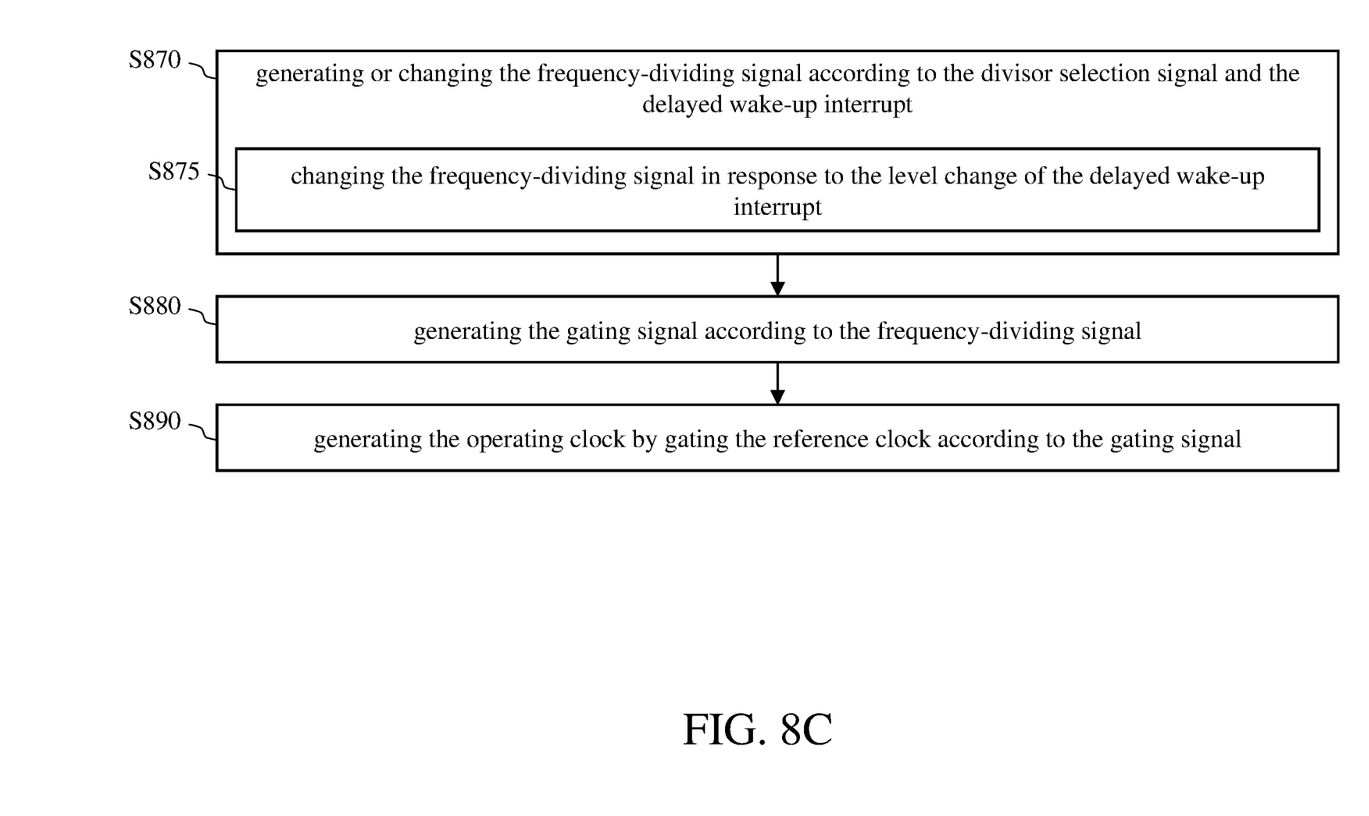

In addition to the aforementioned clock management circuit, the present invention also correspondingly discloses a clock management method. The method is implemented by the aforementioned clock management circuit 120 or its equivalent. FIGS. 8A-8C are flowcharts of the method according to an embodiment. The method includes the following steps.

Step S810: Generating the operating clock CPU_clk according to the reference clock CPU_clk_src. In some embodiments, this step can be performed by the clock control circuit 124; more specifically, it may be performed by the clock-gating circuit 240.

Step S820: Generating the wake-up interrupt CPU_w_intr according to the state signal CPU_sleep. In some embodiments, this step can be performed by the clock control circuit 124; more specifically, it can be performed by the frequency-dividing and wake-up control circuit 220. This step may correspond to the state transition from the state S720 to the state S730 in FIG. 7.

Step S830: Delaying the wake-up interrupt CPU_w_intr to generate the delayed wake-up interrupt dly_CPU_w_intr. In some embodiments, this step may be performed by the delay circuit 122.

Step S840: Adjusting the frequency of the operating clock CPU_clk according to the delayed wake-up interrupt dly_CPU_w_intr. In some embodiments, this step can be performed by the clock control circuit 124. This step may correspond to the state transition from the state S620 to the state S640 in FIG. 6.

Step S850: Controlling the frequency of the operating clock CPU_clk to be a first frequency when the level of the state signal CPU_sleep changes. In some embodiments, this step can be performed by the clock control circuit 124. This step may correspond to the states S610-S620 in FIG. 6, the states S710-S720 in FIG. 7, and symbol "1" in FIG. 4. The first frequency is, for example, the frequency of the stage STG1.

Step S860: Controlling the frequency of the operating clock CPU_clk to be a second frequency when the level of the delayed wake-up interrupt dly_CPU_w_intr changes. The second frequency is greater than the first frequency. In some embodiments, this step can be performed by the clock control circuit 124. This step may correspond to the states S620-S630 in FIG. 6 and symbols "4," "6" or "8" in FIG. 4. The second frequency is, for example, the frequency of the stage STG2 or the stage STG3.

Step S870: Generating or changing the frequency-dividing signal div_st according to the divisor selection signal div_sel and the delayed wake-up interrupt dly_CPU_w_intr. In some embodiments, this step can be performed by the clock control circuit 124; more specifically, it can be performed by the frequency-dividing and wake-up control circuit 220. This step may correspond to the state transition from the state S620 to the state S640 in FIG. 6, where the divisor selection signal div_sel may determine M (M being 4 in the example in FIG. 6).

Step S875: Changing the frequency-dividing signal div_st in response to the level change of the delayed wake-up interrupt dly_CPU_w_intr. This step is a sub-step of step S870. The frequency-dividing FSM 510 determines the state of FIG. 6 (i.e., controlling the frequency-dividing signal div_st to correspond to 1/M, 2/M, . . . ) according to the delayed wake-up interrupt dly_CPU_w_intr.

Step S880: Generating the gating signal icg_en according to the frequency-dividing signal div_st. In some embodiments, this step can be performed by the gated pulse generator 230. An embodiment of the gated pulse generator 230 is shown in FIG. 5.

Step S890: Generating the operating clock CPU_clk by gating the reference clock CPU_clk_src according to the gating signal. In some embodiments, this step can be performed by the clock-gating circuit 240.

Various functional components or blocks have been described herein. As appreciated by persons skilled in the art, in some embodiments, the functional blocks can preferably be implemented through circuits (either dedicated circuits, or general purpose circuits, which operate under the control of one or more processors and coded instructions), which typically comprise transistors or other circuit elements that are configured in such a way as to control the operation of the circuitry in accordance with the functions and operations described herein. As further appreciated by persons skilled in the art, the specific structure or interconnections of the circuit elements can typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

Since a person having ordinary skill in the art can appreciate the implementation detail and the modification thereto of the present method invention through the disclosure of the device invention, repeated and redundant description is thus omitted. Note that the shape, size, and ratio of any element in the disclosed figures are exemplary for understanding, not for limiting the scope of this invention. Furthermore, there is no step sequence limitation for the method inventions as long as the execution of each step is applicable. In some instances, the steps can be performed simultaneously or partially simultaneously.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A clock management circuit for managing an operating clock of a processor circuit, the processor circuit changing a level of a state signal according to an interrupt, the clock management circuit comprising:
    a delay circuit configured to delay a wake-up interrupt to generate a delayed wake-up interrupt; and
    a clock control circuit coupled to the delay circuit and configured to generate the operating clock according to a reference clock, generate the wake-up interrupt according to the state signal, and adjust a frequency of the operating clock according to the delayed wake-up interrupt.

2. The clock management circuit of claim 1, wherein the clock management circuit can control the frequency of the operating clock to be a first frequency, a second frequency, or a third frequency, the first frequency is a lowest operating frequency of the processor circuit, the third frequency is a highest operating frequency of the processor circuit, the second frequency is between the first frequency and the third frequency, the clock control circuit controls the frequency of the operating clock to be the first frequency in response to a level change of the state signal, and the clock control circuit controls the frequency of the operating clock to be the second frequency in response to a level change of the delayed wake-up interrupt.

3. The clock management circuit of claim 2, wherein the delay circuit delays the wake-up interrupt according to a waiting time to generate the delayed wake-up interrupt, and the waiting time can be adjusted through software settings.

4. The clock management circuit of claim 3, wherein the clock control circuit comprises:
    a frequency-dividing and wake-up control circuit configured to generate the wake-up interrupt according to the state signal and generate a frequency-dividing signal according to a divisor selection signal and the delayed wake-up interrupt;
    a gated pulse generator coupled to the frequency-dividing and wake-up control circuit and configured to generate a gating signal according to the frequency-dividing signal; and
    a clock-gating circuit coupled to the gated pulse generator and configured to generate the operating clock by gating the reference clock according to the gating signal.

5. The clock management circuit of claim 4, wherein the frequency-dividing and wake-up control circuit changes the frequency-dividing signal in response to the level change of the delayed wake-up interrupt.

6. A clock management method of managing an operating clock of a processor circuit, wherein the processor circuit changes a level of a state signal according to an interrupt, the clock management method comprising:
    generating the operating clock according to a reference clock;
    generating a wake-up interrupt according to the state signal;
    delaying the wake-up interrupt to generate a delayed wake-up interrupt; and
    adjusting a frequency of the operating clock according to the delayed wake-up interrupt.

7. The clock management method of claim 6, wherein the clock management method can control the frequency of the operating clock to be a first frequency, a second frequency, or a third frequency, the first frequency is a lowest operating frequency of the processor circuit, the third frequency is a highest operating frequency of the processor circuit, and the second frequency is between the first frequency and the third frequency, the clock management method further comprising:
    controlling the frequency of the operating clock to be the first frequency when the level of the state signal changes; and
    controlling the frequency of the operating clock to be the second frequency when a level of the delayed wake-up interrupt changes.

8. The clock management method of claim 7, wherein the step of delaying the wake-up interrupt to generate the delayed wake-up interrupt is to delay the wake-up interrupt for a waiting time, and the waiting time can be adjusted through software settings.

9. The clock management method of claim 7 further comprising:
    generating a frequency-dividing signal according to a divisor selection signal and the delayed wake-up interrupt;
    generating a gating signal according to the frequency-dividing signal; and
    generating the operating clock by gating the reference clock according to the gating signal.

10. The clock management method of claim 9, wherein the step of generating the frequency-dividing signal according to the divisor selection signal and the delayed wake-up interrupt comprises:
    changing the frequency-dividing signal in response to a level change of the delayed wake-up interrupt.

* * * * *